US009561595B1

(12) United States Patent
Dellon

(10) Patent No.: US 9,561,595 B1
(45) Date of Patent: Feb. 7, 2017

(54) CONCENTRIC OPPOSED CAM ACTUATOR

(71) Applicant: Google Inc., Mountain View, CA (US)

(72) Inventor: Brian Dellon, West Roxbury, MA (US)

(73) Assignee: Google Inc., Mountain View, CA (US)

(*) Notice: Subject to any disclaimer, the term of this patent is extended or adjusted under 35 U.S.C. 154(b) by 239 days.

(21) Appl. No.: 14/490,382

(22) Filed: Sep. 18, 2014

Related U.S. Application Data

(60) Provisional application No. 62/041,519, filed on Aug. 25, 2014.

(51) Int. Cl.

| | |
|---|---|
| ***B25J 17/00*** | (2006.01) |
| ***F16H 25/12*** | (2006.01) |
| *B25J 15/02* | (2006.01) |
| *B25J 9/14* | (2006.01) |
| *B25J 9/10* | (2006.01) |

(52) U.S. Cl.

CPC ............ *B25J 17/00* (2013.01); *F16H 25/125* (2013.01); *B25J 9/109* (2013.01); *B25J 9/14* (2013.01); *B25J 9/144* (2013.01); *B25J 9/146* (2013.01); *B25J 15/02* (2013.01); *B25J 15/028* (2013.01); *B25J 15/0226* (2013.01); *Y10S 901/28* (2013.01)

(58) Field of Classification Search

CPC .............. B25J 9/14; B25J 9/109; B25J 9/144; B25J 9/146; B25J 15/02; B25J 15/0226; B25J 15/028; B25J 17/00; Y10S 901/20; F16H 25/125

USPC ..... 74/56, 479.01, 490.1; 92/71; 901/19, 20, 901/22

See application file for complete search history.

(56) References Cited

U.S. PATENT DOCUMENTS

| | | | |
|---|---|---|---|
| 1,052,763 A | 2/1913 | Stone et al. | |
| 1,746,545 A | 2/1930 | Malm | |
| 2,978,915 A | 4/1961 | Metcalf | |
| 3,046,802 A | 7/1962 | Cupedo | |
| 3,315,413 A | 4/1967 | Beecher | |
| 4,068,536 A * | 1/1978 | Stackhouse .............. | B25J 9/045 414/1 |
| 4,504,038 A | 3/1985 | King | |
| 4,651,969 A | 3/1987 | Dowdall | |
| 4,960,007 A | 10/1990 | Weyer | |
| 5,005,805 A | 4/1991 | Morris et al. | |
| 5,031,470 A | 7/1991 | Karlsson | |
| 5,447,095 A | 9/1995 | Weyer | |

(Continued)

FOREIGN PATENT DOCUMENTS

| | | |
|---|---|---|
| RU | 2338663 | 11/2008 |

*Primary Examiner* — Terence Boes
*Assistant Examiner* — Randell J Krug
(74) *Attorney, Agent, or Firm* — McDonnell Boehnen Hulbert & Berghoff LLP

(57) ABSTRACT

An example device may include a rounded outer incline ramp and a rounded inner incline ramp surrounding a central axis. The rounded inner incline ramp and the rounded outer incline ramp may be inversely aligned relative to the central axis. The device may also include a piston carrier oriented in a direction parallel to the central axis. The piston carrier may include a first piston including a first roller positioned on the two ramps at a first point, where the first piston is configured to act on the two ramps in a direction parallel to the central axis. The piston carrier may also include a second piston including a second roller positioned on the two ramps at a second point opposite the first point, where the second piston is configured to act on the two ramps in a direction parallel to the central axis.

17 Claims, 8 Drawing Sheets

220 202 204 210 208 206 216 218 222 214 212

(56) References Cited

U.S. PATENT DOCUMENTS

| | | | |
|---|---|---|---|
| 6,793,194 | B1 | 9/2004 | Grinberg |
| 7,185,852 | B2 | 3/2007 | Kannapell |
| 7,584,737 | B2 | 9/2009 | Zhao |
| 7,948,688 | B2 | 5/2011 | Watanabe |
| 8,047,094 | B2 | 11/2011 | Love et al. |
| 8,104,443 | B2 | 1/2012 | Krozek |
| 2003/0015048 | A1 | 1/2003 | Schmidt et al. |
| 2011/0196509 | A1 | 8/2011 | Jansen et al. |
| 2014/0123789 | A1 | 5/2014 | Saunders et al. |

* cited by examiner

CONCENTRIC OPPOSED CAM ACTUATOR

CROSS REFERENCE TO RELATED APPLICATION

The present application claims priority to U.S. Provisional patent application Ser. No. 62/041,519, filed on Aug. 25, 2014, and entitled "Concentric Opposed Cam Actuator," which is herein incorporated by reference as if fully set forth in this description.

BACKGROUND

Unless otherwise indicated herein, the materials described in this section are not prior art to the claims in this application and are not admitted to be prior art by inclusion in this section.

A robotic device includes a mechanical agent, usually an electro-mechanical machine that is guided by a computer program or electronic circuitry. Robots can be autonomous or semi-autonomous and range from humanoid designs, to large industrial designs with jointed arms and end effectors to perform specialized tasks.

Such robotic devices may include several joints configured to enable the robotic device to perform a variety of functions and movements. For example, a humanoid robotic device may include hip joints, ankle joints, and/or wrist joints. In some example operations, such joints of a robotic device may use rotational motion to perform desired functions. Motions of robotic joints may be controlled by actuators, which may be operated by a source of energy such as electric current or hydraulic fluid pressure. The actuators may convert the energy into motion, such as to rotate a joint of a robotic device.

SUMMARY

The present application discloses embodiments that relate to a concentric opposed cam actuator. In one example, an actuator may include an outer end cam and an inner end cam nested inside the outer end cam. The two end cams may be shaped as rounded incline ramps surrounding a central axis and may be inversely aligned relative to the central axis to allow a piston carrier to act on the two ramps. The actuator may additionally include a piston carrier with two antagonistic pistons offset from the central axis. The first piston may contain a roller that acts on the two ramps at a first point, and the second piston may contain a roller that acts on the two ramps at a second point opposite the first point. Linear actuation of one of the pistons toward the end cams may cause rotation of at least one of the end cams, and may also cause linear motion of the other piston in a direction away from the end cams.

In one example, a device is disclosed. The device may include a rounded outer incline ramp surrounding a central axis. The device may further include a rounded inner incline ramp surrounding the central axis with a smaller radius than the rounded outer incline ramp, where the rounded inner incline ramp and the rounded outer incline ramp are inversely aligned relative to the central axis. The device may additionally include a piston carrier oriented in a direction parallel to the central axis. The piston carrier may include a first piston including a first roller positioned on the rounded outer incline ramp and the rounded inner incline ramp at a first point, where the first piston is configured to act on the rounded outer incline ramp and the rounded inner incline ramp in a direction parallel to the central axis. The piston carrier may further include a second piston including a second roller positioned on the rounded outer incline ramp and the rounded inner incline ramp at a second point opposite the first point, where the second piston is configured to act on the rounded outer incline ramp and the rounded inner incline ramp in a direction parallel to the central axis.

In another aspect, a robotic system is disclosed. The robotic system may include at least one rotational joint and at least one actuator configured to enable rotation of the at least one rotational joint. The at least one actuator may include a rounded outer incline ramp surrounding a central axis. The at least one actuator may further include a rounded inner incline ramp surrounding the central axis with a smaller radius than the rounded outer incline ramp, where the rounded inner incline ramp and the rounded outer incline ramp are inversely aligned relative to the central axis. The at least one actuator may additionally include a piston carrier oriented in a direction parallel to the central axis. The piston carrier may include a first piston including a first roller positioned on the rounded outer incline ramp and the rounded inner incline ramp at a first point, where the first piston is configured to act on the rounded outer incline ramp and the rounded inner incline ramp in a direction parallel to the central axis. The piston carrier may further include a second piston including a second roller positioned on the rounded outer incline ramp and the rounded inner incline ramp at a second point opposite the first point, where the second piston is configured to act on the rounded outer incline ramp and the rounded inner incline ramp in a direction parallel to the central axis.

In yet another aspect, a method is disclosed. The method may include determining a grounded component from a group of three components to enable rotation of two ungrounded components from the group about a central axis, where the group comprises (1) a rounded outer incline ramp surrounding the central axis, (2) a rounded inner incline ramp surrounding the central axis and inversely aligned from the rounded outer incline ramp, and (3) a piston carrier oriented in a direction parallel to the central axis. The method may further include causing the grounded component to become fixed from rotation about the central axis. The method may additionally include driving a first piston of the piston carrier toward the rounded outer incline ramp and the rounded inner incline ramp to produce rotations of the two ungrounded components and to force a second piston from the piston carrier in a direction away from the rounded outer incline ramp and the rounded inner incline ramp.

In a further aspect, a system may include means for determining a grounded component from a group of three components to enable rotation of two ungrounded components from the group about a central axis, where the group comprises (1) a rounded outer incline ramp surrounding the central axis, (2) a rounded inner incline ramp surrounding the central axis and inversely aligned from the rounded outer incline ramp, and (3) a piston carrier oriented in a direction parallel to the central axis. The system may further include means for causing the grounded component to become fixed from rotation about the central axis. The system may additionally include means for driving a first piston of the piston carrier toward the rounded outer incline ramp and the rounded inner incline ramp to produce rotations of the two ungrounded components and to force a second piston from the piston carrier in a direction away from the rounded outer incline ramp and the rounded inner incline ramp.

These as well as other aspects, advantages, and alternatives, will become apparent to those of ordinary skill in the art by reading the following detailed description, with reference where appropriate to the accompanying figures.

DETAILED DESCRIPTION

Figure 1:
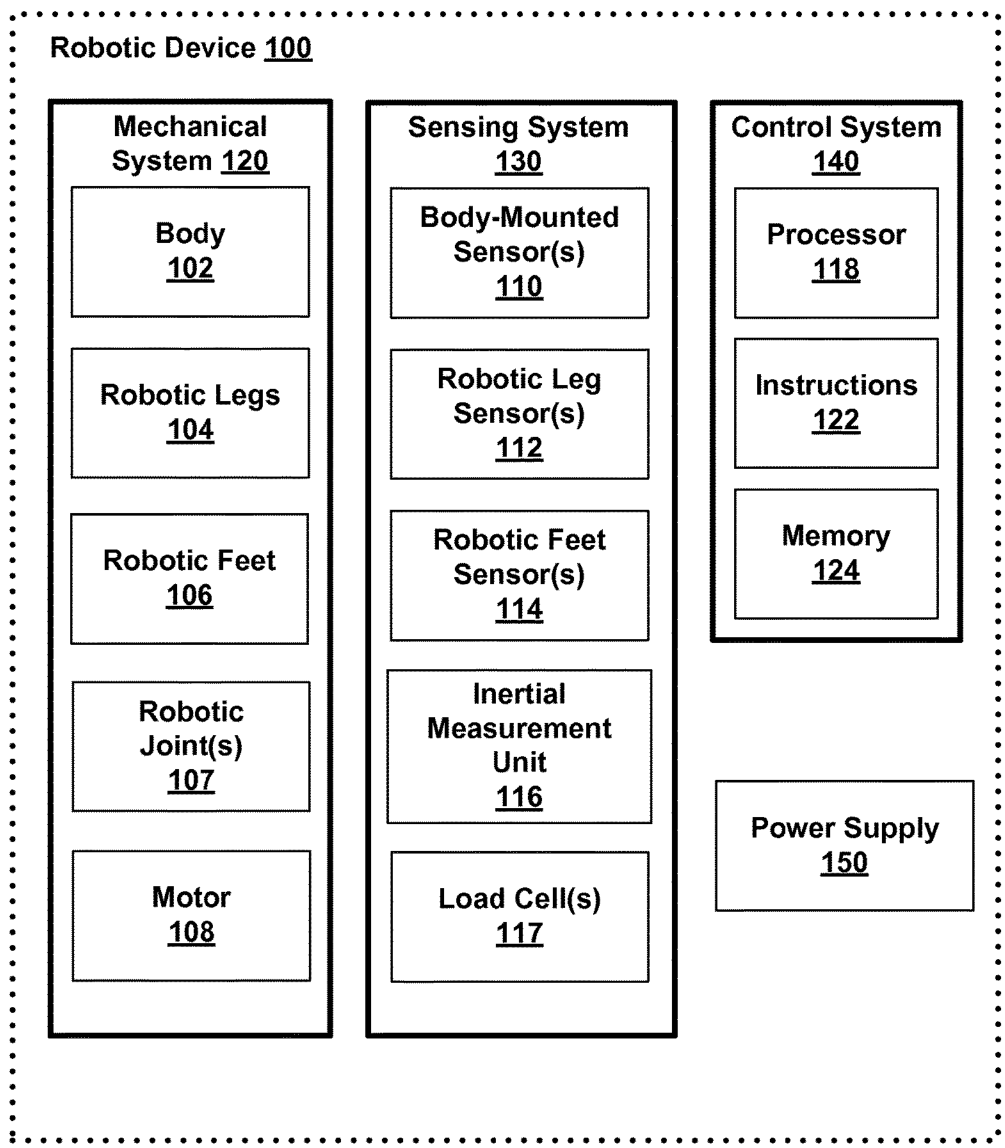
FIG. 1 is a functional block diagram illustrating a robotic device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Robotic devices may include several joints configured to enable the robotic device to perform a variety of functions and movements. For example, a robotic device may include hip joints, ankle joints, and/or wrist joints. In some example operations, such joints of a robotic device may use rotational motion to perform desired functions. Motions of robotic joints may be controlled by actuators, which may be operated by a source of energy such as electric current or hydraulic fluid pressure. In some examples, an actuator may convert linear motion into rotational motion, such as to rotate a joint of a robotic device.

More specifically, a linear-to-rotary transmission actuator may be used to convert linear motion from linearly actuated pistons into rotary motion to create rotary reciprocating motion for a twist joint of a robot, such as a forearm. A linear-to-rotary actuator may use two antagonistic pistons that act on a helix-shaped end cam capable of rotation. As one piston pushes down, the end cam may rotate, which may cause the second piston to get pushed back up. To rotate in the other direction, the second piston may be driven to push down on the end cam, causing the end cam to rotate in the other direction and also causing the first piston to get pushed back up. An actuator with antagonistic pistons and a single helix-shaped end cam may be limited to a range of less than 180 degrees of rotational motion because each piston may only be able to act on half of the surface of the end cam.

Example embodiments may use two concentric, nested cams to provide a greater range of rotational motion. More specifically, a first end cam may be shaped as a circular outer incline ramp surrounding a central axis. A second end cam may be shaped as a circular inner incline ramp that is nested inside the outer end cam and aligned opposite the outer end cam. Aligning the outer end cam and the inner end cam opposite each other may cause the outer end cam and the inner end cam to cross at two points orthogonal to the central axis (e.g., to have the same height or roughly the same height as measured in a direction along the central axis).

Additionally, an actuator may include a piston carrier containing two antagonistic pistons which each have rollers that act on both the outer end cam and the inner end cam. The first piston may act on both end cams at the first point where the outer end cam and the inner end cam cross. The second piston may act on both end cams at the second point where the outer cam and the inner cam cross. Furthermore, the piston carrier itself may also be capable of rotation about the central axis.

The actuator therefore may include three concentric bodies (e.g., the piston carrier and the two end cams) that each can rotate about a collinear axis. Within examples, any one of the three concentric bodies can be used as a ground and held fixed from rotation while the other two bodies are allowed to rotate.

To provide a range of rotational motion greater than 180 degrees, one of the end cams may be held fixed. For instance, the inner end cam may be fixed from rotating. As a piston from the piston carrier pushes down on the two end cam surfaces, the piston carrier may then rotate based on the helix angle of the inner cam. The roller at the end of the piston may also transfer motion to the outer cam through the helix angle of the outer cam. This rotation on top of rotation based on the helix angles of the two cams may produce a gearing effect to increase the rotational motion of the outer cam. The helix pitch of a cam depends on both the cam radius and the helix angle. If the helix pitch of the two cam surfaces is the same, the rotational motion of the outer cam may be doubled with half the torque output. In other examples, the two cam surfaces may have a different helix pitch to create different gear ratios.

Additionally, the rotational motion may be produced with low friction and no backlash. To enable the mechanism to have zero backlash, the retracting linear body may be provided with a minor pre-load against the cam surfaces. For instance, in an example hydraulic variant, this may be accomplished by creating an effective 'H-bridge' between the two fluid chambers behind the pistons. When one piston is actuated (i.e., extended), its fluid chamber is connected to the supply pressure (high pressure), while the retracting piston's fluid chamber is connected to the return line (low pressure), thus flowing back to the reservoir as the piston retracts. The return pressure acts as a spring to keep the retracting piston in contact with the cams. When the 'H-bridge' is toggled and the retracting piston's fluid chamber is connected to the supply pressure (high pressure), the actuator moves in the other direction and without backlash because the retracting piston was previously in contact. The hydraulic analogue of the 'H-bridge' is a servo valve.

In further examples, the transmission may be used as a type of differential. For instance, the piston carrier may be chosen as the ground, and fixed from rotating. As a piston from the piston carrier pushes down, the outer end cam and the inner end cam may be caused to rotate in opposite directions as the roller of the piston moves down the ramps of both cams. Linear motion of the piston may therefore be transferred to rotational motion of both end cams. Depending on the helix angles of the two end cams, a different angular velocity may be produced for each of the two end cams.

In further examples, the ramps of one or both cams may undulate rather than having a straight helix slope. This may allow the transmission to have different gear ratios at different points of the cams. At a shallow helix angle, most of the piston force may be directed to pushing on the cam surface, rather than causing rotation. At a steep helix angle, most of the force may produce torque that rotates the cam. This type of design may be useful for joints (e.g., of a robot) where asymmetry in joint strength is desirable (e.g., stronger at some points of motion and faster at other points of motion). In additional examples, this type of non-linear transmission may also help to optimize the overall packaging length. In particular, a steeper cam angle implies a taller assembly (e.g., axially).

It should be understood that the above examples are provided for illustrative purposes, and should not be construed as limiting. As such, example systems and methods may additionally or alternatively include other features or include fewer features, without departing from the scope of the invention.

Referring now to the figures, FIG. 1 illustrates a functional block diagram illustrating a robotic device 100, according to an example embodiment. The robotic device 100 may include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1.

The mechanical system 120 may include several components, including a body 102, one or more robotic legs 104, and one or more robotic feet 106 coupled to the one or more robotic legs 104. The mechanical system 120 may also include one or more robotic joints 107, configured to enable the robotic device to perform a variety of functions and movements, as discussed in more detail below. The mechanical system 120 may additionally include a motor 108, which may be an electric motor powered by electrical power, or may be powered by a number of different energy sources, such as a gas-based fuel or solar power. Additionally, motor 108 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may determine information about the environment that can be used by control system 140 (e.g., a computing device running motion planning software). The control system 140 could be located on the robotic device 100 or could be in remote communication with the robotic device 100. In one particular example, the sensing system 130 may use one or more body-mounted sensors 110 attached to the body 102 of the robotic device 100, which may be 2D sensors and/or 3D depth sensors that sense information about the environment as the robotic device 100 moves. For example, the body-mounted sensors 110 may determine a distance between the body 102 of the robotic device 100 and the ground surface on which the robotic device 100 operates. In further examples, one or more robotic leg sensors 112 may be located on the robotic legs 104 of the robotic device 100. The robotic leg sensors 112 may be contact sensors configured to alert the robotic device when the robotic legs 104 are in contact with the ground surface. In another example, the robotic legs 104 may be coupled to robotic feet 106 that contact the ground surface. In such a case, the robotic device 100 may include one or more robotic feet sensors 114 positioned on the robotic feet 106 of the robotic device 100. The robotic feet sensors 114 may be contact sensors configured to alert the robotic device 100 when the robotic feet 106 are in contact with the ground surface.

The sensing system 130 may further include an inertial measurement unit (IMU) 116. In an illustrative embodiment, IMU 116 may include both an accelerometer and a gyroscope, which may be used together to determine the orientation, position, and/or velocity of the robotic device 100. In particular, the accelerometer can measure the orientation of the robotic device 100 with respect to gravity, while the gyroscope measures the rate of rotation around an axis. IMUs are commercially available in low-cost, low-power packages. For instance, an IMU 116 may take the form of or include a miniaturized MicroElectroMechanical System (MEMS) or a NanoElectroMechanical System (NEMS). Other types of IMUs may also be utilized. The IMU 116 may include other sensors, in addition to accelerometers and gyroscopes, which may help to better determine position and/or help to increase autonomy of the robotic device 100. Two examples of such sensors are magnetometers and pressure sensors. Other examples are also possible.

The sensing system may further include one or more load cells 117. Load cells 117 may be provided at all of the robotic joints 107 of the robotic device 100, or at selected joints such as an elbow joint, for example. Example load cells 117 may include a multi-axis load cell that includes strain gauges on multiple surfaces to sense forces along multiple axes. Urethane (or other rubber, plastic, epoxy material) may be included surrounding the load cell to enable an applied force to be sensed by the strain gauges.

An example load cell 117 may be internal to an actuator of the robotic joint 107 and coupled between the actuator 102 and the robotic joint 107, provided on the actuator, or provided on the robotic joint 107. The load cell 117 may further be a component internal of the robotic joint 107. The load cell 117 may include a transducer to detect and convert an applied force to the robotic manipulator into an electrical signal. For example, a force being sensed deforms a strain gauge of the load cell 117, and the strain gauge measures the deformation (strain) as an electrical signal because the strain changes an effective electrical resistance of the gauge. The load cell 116 may include four strain gauges in a Wheatstone bridge configuration, one strain gauge in a quarter-bridge configuration, or two strain gauges in a half-bridge configuration. The electrical signal output may be in the order of a few millivolts and may be amplified as well.

Many or all of the functions of the robotic device 100 could be controlled by control system 140. Control system 140 may include at least one processor 118 (which could include at least one microprocessor) that executes instructions 122 stored in a non-transitory computer readable medium, such as the memory 124. The control system 140 may also represent a plurality of computing devices that may serve to control individual components or subsystems of the robotic device 100 in a distributed fashion.

In some embodiments, memory 124 may contain instructions 122 (e.g., program logic) executable by the processor 118 to execute various functions of robotic device 100, including those described below. Memory 124 may contain additional instructions as well, including instructions to transmit data to, receive data from, interact with, and/or control one or more of the mechanical system 120, the sensor system 130, and/or the control system 140.

Figure 2A:
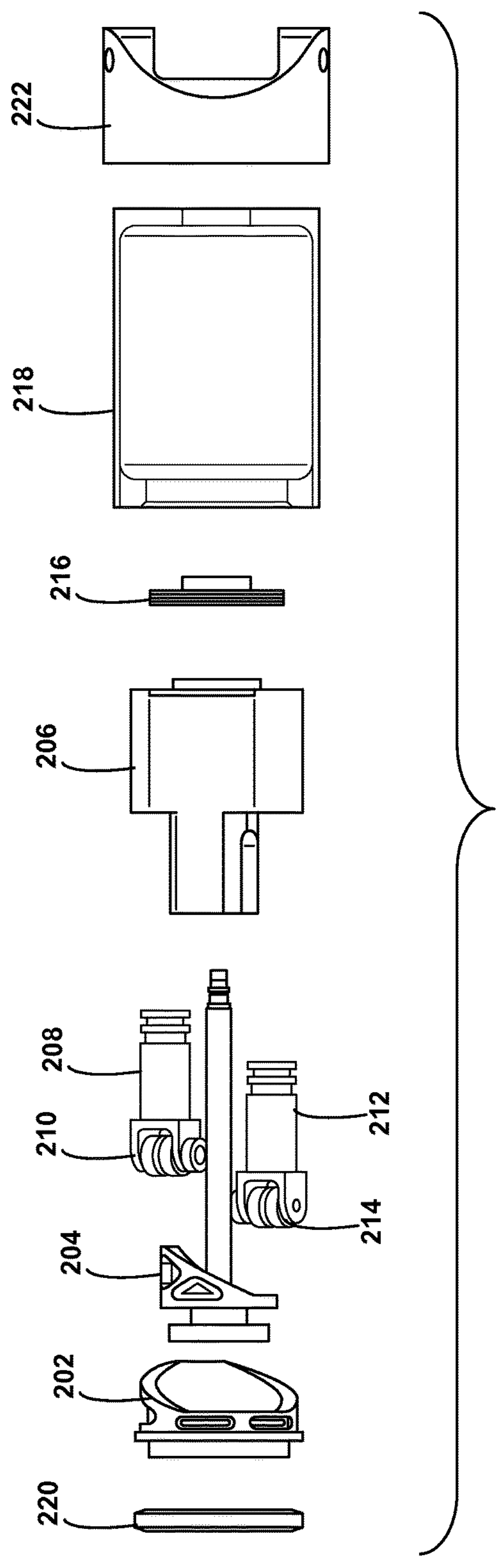
FIG. 2A illustrates components of an actuator, according to an example embodiment.

As described above, a robotic device may include several joints configured to enable the robotic device to perform a variety of functions and movements. For example, a humanoid robotic device may include hip joints, ankle joints, and/or wrist joints. Such robotic joints may use a linear-to-rotary transmission actuator to produce rotational motion. FIG. 2A illustrates components of a device for converting linear motion to rotational motion, according to an example embodiment.

More specifically, the actuator may include an outer end cam 202 that is oriented around a central axis that may run through a center line of the device. The outer end cam 202 may be shaped as a rounded incline ramp. For instance, the outer end cam 202 may include a first semicircular portion that extends from a lowest point to a highest point, and a second semicircular portion opposite the first semicircular portion. The outer end cam 202 may contain a top surface on which a roller can bear with minimal friction. In some examples, the two semicircular portions may have the same shape and incline angle. In other examples, the shape or angle may be different between the two semicircular portions. Other rounded shapes may be used for the ramp shape as well (e.g., ovals).

The actuator may also include an inner end cam 204 with a smaller radius than the outer end cam 202. The inner end cam 204 may also be shaped as a rounded incline ramp. For instance, the inner end cam 204 may include a first semicircular portion that extends from a lowest point to a highest point, and a second semicircular portion opposite the first semicircular portion. In some examples, the inner end cam 204 may have the same relative shape and/or incline angle as the outer end cam 202. The inner end cam 204 may be oriented around the same central axis as the outer end cam 202 such that the inner end cam 204 is nested inside of the outer end cam 202. The inner end cam 202 may also contain a top surface on which a roller can bear with minimal friction.

Additionally, the inner end cam 204 may be inversely aligned relative to the outer end cam 202. In some examples, this alignment may allow the top surfaces of the inner end cam 204 and the outer end cam 202 to cross at a first point and a second point orthogonal to the central axis. In one example, the inner end cam 204 and the outer end cam 202 may be coupled to allow a range of rotational motion including an alignment in which the inner end cam 204 is oriented 180 degrees opposite the outer end cam 202. In such a configuration, the highest point of the outer end cam 202 may be aligned with the lowest point of the inner end cam 204 and the lowest point of the outer end cam 202 may be aligned with the highest point of the inner end cam 204.

The actuator may additionally include a piston carrier 206, which may also be oriented to surround the central axis. The piston carrier 206 may contain a first piston 208 and a second piston 212 which are offset from the central axis. In some examples, the first piston 208 and second piston 212 may be offset from the central axis in opposite directions. The first piston 208 may contain a first roller 210 which bears on surfaces of the inner end cam 204 and the outer end cam 202 at a first point where the inner end camp 204 and the outer end camp 202 cross relative to the central axis. Additionally, the second piston 212 may contain a second roller 214 which bears on surfaces of the inner end cam 204 and the outer end cam 202 at a second point where the inner end camp 204 and the outer end camp 202 cross relative to the central axis.

In further examples, the rollers 210 and 214 may be cylindrical or spherical in shape, and may fit into the surfaces of the outer end cam 202 and the inner end cam 204 such that contact between the rollers 210, 214 and swept surfaces on the cams 202, 204 may be maintained through an entire range of motion of the pistons 208, 212. In additional examples, the rollers 210 and 214 may each contain two separate rollers which are capable of rolling independently of one another. More specifically, the roller 210 may contain an outer roller portion (e.g., an outer cylindrical roller) which acts on the surface of outer end cam 202 and an inner roller portion (e.g., an inner cylindrical roller) which acts on the surface of inner end cam 204. Similarly, the roller 214 may also contain an outer roller portion which acts on the surface of outer end cam 202 and an inner roller portion which acts on the surface of inner end cam 204.

In additional examples, each piston assembly may additionally contain a third roller which may act as a constraint on the piston to keep the piston from rotating (e.g., twisting about the piston axis) due to the forces imparted from the end cams. In some examples, this additional roller may be located closest to the central axis and may engage a slot located within the piston carrier.

The actuator may further include a cylindrical outer housing 218, which may contain the end cams 202, 204 and the piston carrier 206. The housing 218 may additionally include a circular bottom cap 220 and a thrust bearing stack 216 to enclose the rotating components. The thrust bearing stack 216 may support the piston carrier axially and provide a low friction surface against the piston thrust loads. Furthermore, each of the outer end cam 202, inner end cam 204, and the piston carrier 206 may be coupled to at least one of the housing 218, the bottom cap 220, and the thrust bearing stack 216 such that the outer end cam 202, inner end camp 204, and the piston carrier 206 are constrained from radial motion.

The actuator may additionally include a connector 222 that may allow for connection with an additional component (e.g., of a robotic device). For instance, the connector may include one or more holes near a top end of the actuator which may be configured for coupling the actuator to one or more additional components. In other examples, the actuator may be connected to other components at other places or in other ways as well or instead. For instance, a separate connector could be attached to a bottom end of the actuator to couple the actuator to a component in a different relative position.

Figure 2B:
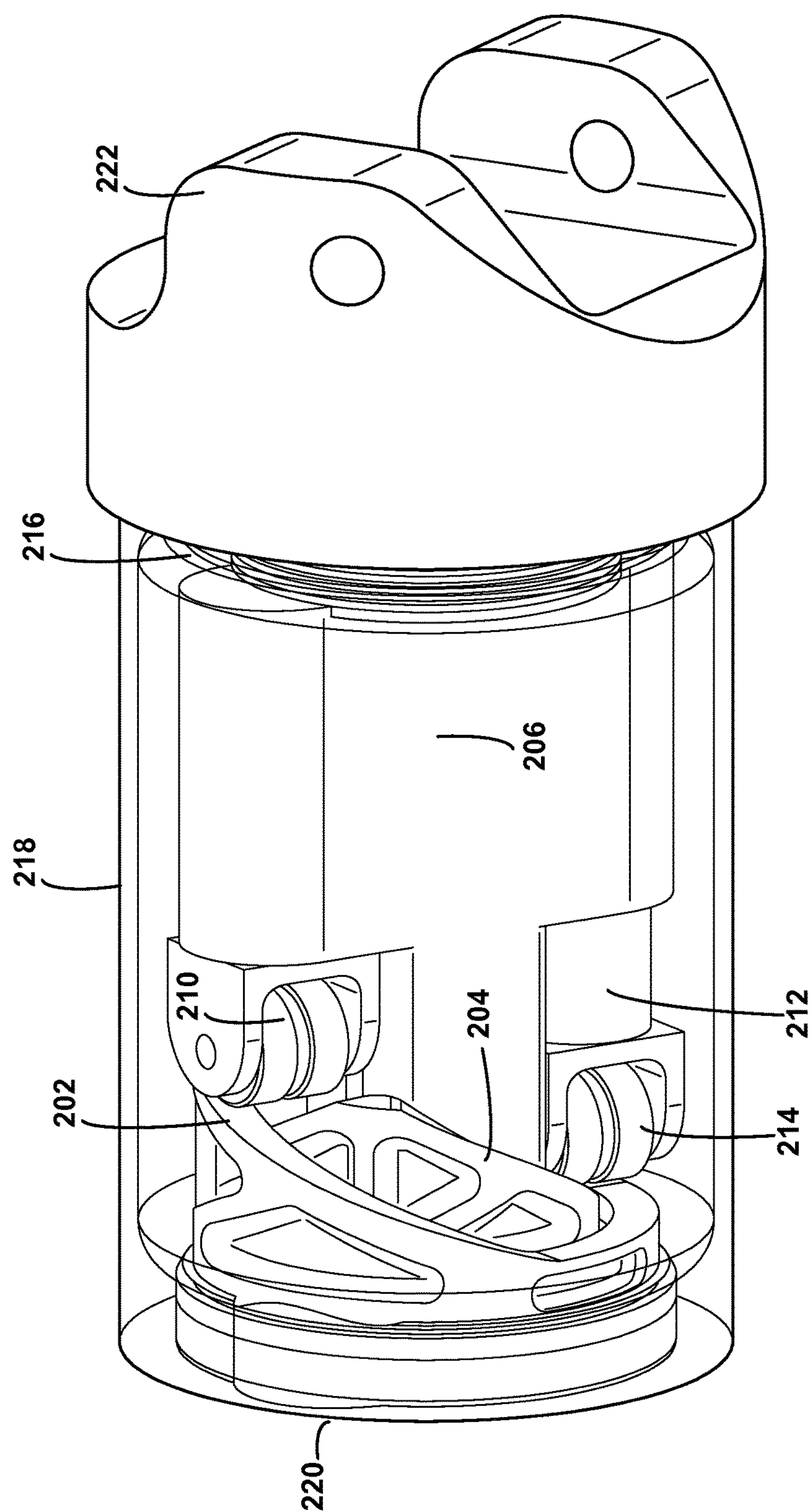
FIG. 2B illustrates a side view of an actuator, according to an example embodiment.
Figure 2C:
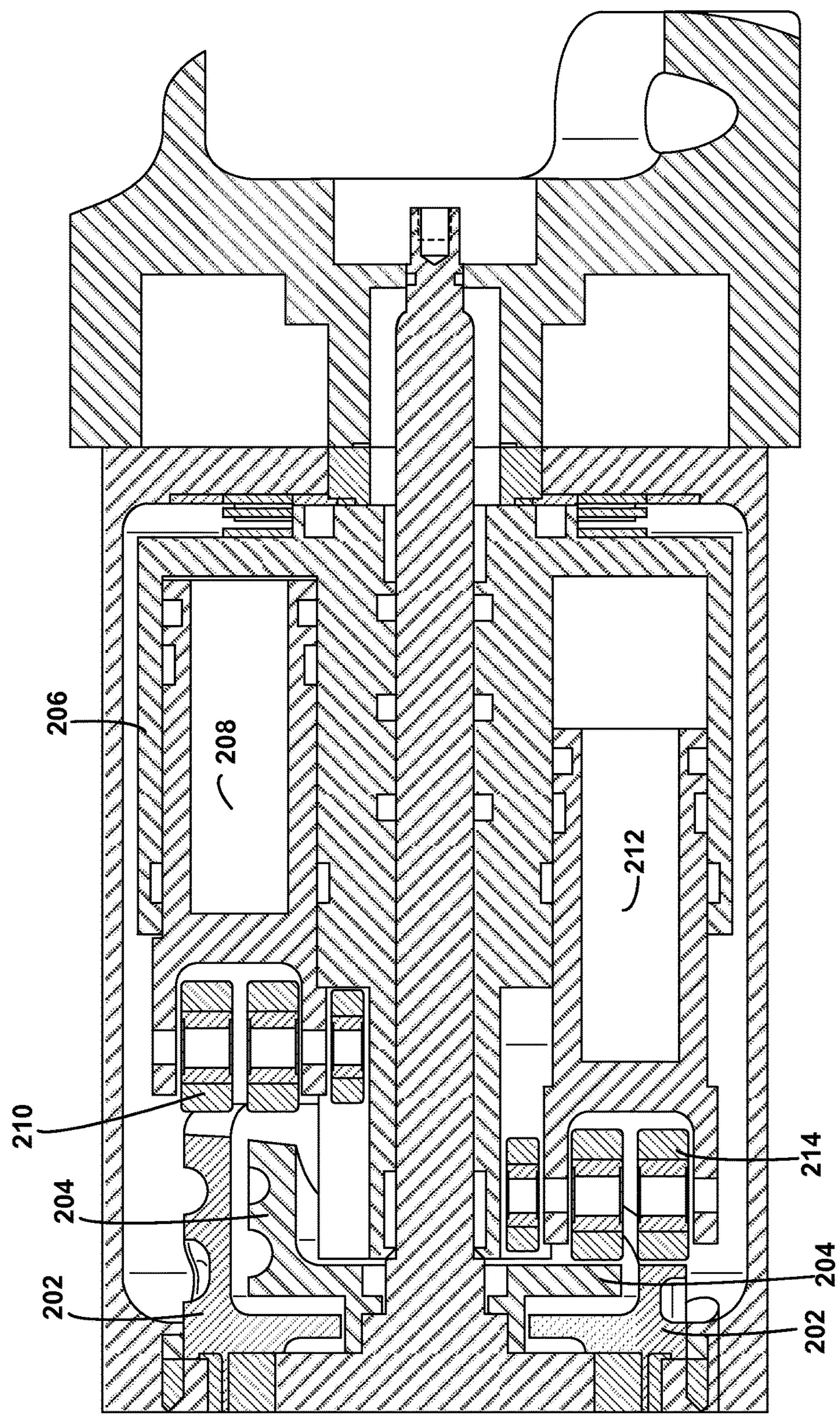
FIG. 2C illustrates a cross-sectional view of an actuator, according to an example embodiment.

FIG. 2B shows a side view of an actuator, according to an example embodiment. Additionally, FIG. 2C shows a cross-sectional view of the actuator, according to an example embodiment. More specifically, the actuator may contain nested concentric end cams 202 and 204, shaped as circular incline ramps. The actuator may also contain a piston carrier 206, which may be capable of rotation about the same central axis as the end cams 202 and 204. In some examples, one of the three concentric bodies (the outer end cam 202, the inner end cam 204, and the piston carrier 206) may be held fixed as a ground, while the other two components are allowed to rotate about the central axis. Linear motion of one of the two pistons from the piston carrier 206 may then cause rotation of the two ungrounded components.

For instance, in reference to FIGS. 2B and 2C, a piston 212 from piston carrier 206 may be driven towards the end cams 202 and 204. Because the end cams 202, 204 are constrained radially, one or both of the end cams 202, 204 may be forced to rotate to accommodate the downward motion of the roller 214 (depending on which of the rotational components is used as a ground). The rotation of one or both of the end cams 202, 204 may force the other piston 208 back up into the piston carrier 206 via roller 210. In one example, as illustrated in FIGS. 2B and 2C, when the piston 212 is driven as far down as its linear range of motion allows, the other piston 208 (not visible in FIG. 2B) may be driven up to a point where the piston 208 is fully contained within piston carrier 206.

In one example, the pistons 206, 208 may be activated using hydraulic pressure. Accordingly, in order to drive one of the pistons towards the end cams, pressurized hydraulic fluid may be applied in a chamber behind the piston. Meanwhile, hydraulic fluid may be allowed to flow at least unimpeded (and optionally assisted by suction, although suction could cause cavitation and may add backlash) out of a chamber behind the second piston to allow the second piston to be driven in an opposite direction from the first piston. Similar principles may apply if the actuators are powered by voice coil motors, pneumatics, solenoids or other power sources.

Within examples, any one of the three rotational components (the two end cams and the piston carrier) may be chosen as a grounded component and fixed from rotation. In some examples, an extended range of rotational motion beyond 180 degrees may be achieved by fixing one of the end cams to produce a gearing effect.

For instance, in one example, the inner end cam may be fixed from rotation. Then, when one of the pistons pushes down on the two end cams, the roller of the piston will bear against the grounded inner end cam, causing both the outer end cam and the piston carrier to rotate. More specifically, the outer end cam will rotate based on the incline angle of the outer end cam. Additionally, the piston carrier will rotate based on the incline angle of the inner cam, which will also transfer the motion of the piston carrier to the outer end cam. The net result will be a gearing effect that causes the outer cam to rotate faster than the piston carrier. If the pitch of the two end cams (which depends on both the radii and helix angles of the cams) is the same, the net effect will be a doubling of rotational motion of the outer end cam with half the torque output.

The gearing effect may allow the outer end cam to achieve a range of rotational motion greater than 180 degrees even though each piston may only act on a 180 degree semicircular portion of each end cam. Because the rollers may take up part of the angular rotation, the total achievable range of rotational motion of the outer end cam may be less than 360 degrees, but still relatively close to 360 degrees (e.g., approximately 340 degrees).

In some examples, an actuator may be designed with equal pitch for the inner cam and outer cam in order to cause the two rotating bodies to rotate with the same angular velocity. In other examples, different gear ratios may be obtained by using cam surfaces with different pitch. Accordingly, an actuator with different incline angles for the two cams may produce different angular velocities for the two rotating components.

In some examples, the two pistons may have the same diameter in order to create a balanced actuator that produces the same amount of torque in either direction. For instance, the mechanism may be designed to produce 100 Newton Meters (Nm) in one rotational direction and 100 Nm in the reverse direction as well. In other examples, the piston diameters may be different to create an unbalanced actuator. By using different diameters, one piston may drive with greater force, which may produce greater torque in one direction than the reverse direction.

In further examples, the piston carrier may be fixed from rotation as the grounded component. In particular, if the piston carrier is fixed from rotation and a piston is driven down towards the inner cam and the outer cam, the piston may force the two end cams to rotate in opposite directions from each other as the roller of the piston moves down the ramps of both end cams. Additionally, if the other piston from the piston carrier is then driven down towards the end cams, the cams may again be forced to rotate in opposite directions by forcing both end cams to reverse their direction of rotation.

In additional examples, the mechanism may act as a differential. In particular, the differential action may come from the power transfer between the three elements. If one rotating component is acted upon by an external entity to either speed or slow its motion, the average velocity of the other two components will adapt to conserve the input power across the rotating members. In further examples, the mechanism could also work as a limited slip clutch by creating a torsional pre-load on one of the members. For instance, the piston carrier may be grounded through a friction member that allows a set torque limit. When this torque limit is exceeded through external force on one of the two rotating cams, the piston carrier may slip and then may rotate freely to transfer power.

In examples where the piston carrier is fixed from rotation and the helix pitch of the two end cams is the same, the two end cams may rotate at the same speed when one of the pistons from the piston carrier acts on the end cams. In other examples, the helix pitch of the two end cams may be different, which may cause the two end cams to rotate with different angular velocities as one of the pistons is driven toward the end cams.

Figure 3A:
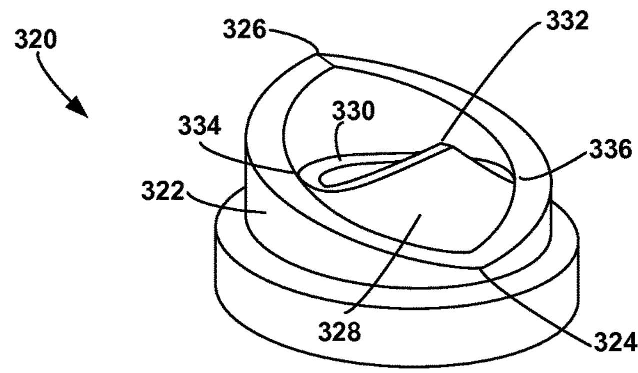
FIGS. 3A-3C illustrates examples of concentric nested cams, in accordance with at least some embodiments described herein.

FIG. 3A shows nested concentric cams, according to an example embodiment. More specifically, two nested cams 320 may include an outer cam 322 and an inner cam 328. The inner cam 328 may have a smaller radius than the outer cam 322 such that the inner cam fits inside the outer cam 322 (e.g., directly adjacent or with a certain amount of space in between the two cams). The outer cam 322 may have a lowest point 324 opposite a highest point 326. Additionally, the inner cam 328 may also have a lowest point 330 opposite a highest point 332. In some examples, the outer cam 322 and the inner cam 328 may have a same relative shape and incline angle to create the same angular velocity for both cams.

Additionally, the outer cam 322 and the inner cam 328 may be coupled in an orientation that causes the surfaces of the outer cam and inner cam to have a same height at two points orthogonal to the central axis. For instance, in reference to FIG. 3A, the two end cams may have the same height or roughly the same height at a first point 334 and at a second point 336. Accordingly, a first piston with a roller configured to act on both the outer cam 322 and the inner cam 328 may be aligned with the first point 334. Additionally, a second piston with a roller configured to act on both the outer cam 322 and the inner cam 328 may be aligned with the second point 336.

Figure 3B:
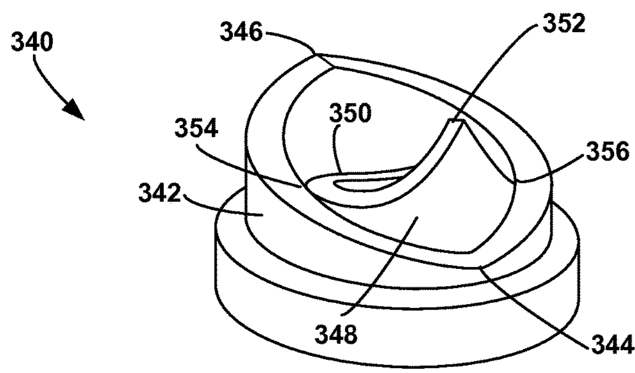

In other examples, the outer cam and the inner cam may have different helix angles to allow for a tradeoff between torque and range of motion for the actuator. In particular, a shallow angle on one cam will give the corresponding member a high rotation rate (i.e., more range of motion), while a steep angle will produce less rotation, but contribute to a higher overall torque. The combination of the cam angles as well as radii defines the mechanical advantage and thus the torque for the system. For instance, FIG. 3B shows concentric nested cams 340 with different incline angles, according to an example embodiment. More specifically, an outer cam 342 may have a lowest point 344 that rises to a highest point 346 at a certain angle of incline. Additionally, an inner cam 348 nested inside the outer cam 342 may have a lowest point 350 that rises to a highest point 352 at a steeper angle of incline. By using different incline angles, an actuator may be designed with cams that rotate within different ranges of rotational motion.

Figure 3C:
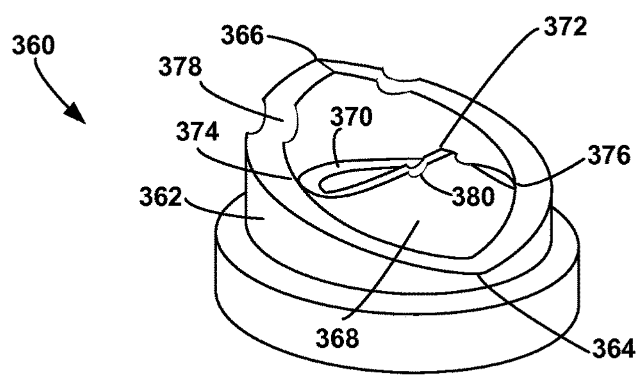

In additional examples, one or both of the outer cam and the inner cam may have non-constant incline angles. By using a non-constant incline angle, the transmission ratio may be varied based on the local angle of the helix at which a roller is located. For instance, FIG. 3C shows concentric nested cams 360 with non-constant incline angles, according to an example embodiment. More specifically, an outer cam 362 may have a lowest point 364 that rises to a highest point 366 at a non-constant angle, such that the surface of the outer cam 362 has one or more undulations 378. Additionally, an inner cam 368 nested inside outer cam 362 may rise from a lowest point 364 to a highest point 366, such as that the inner cam 368 has one or more undulations 380.

By using cam surfaces with non-constant incline angles, different transmission ratios may be achieved at different points of motion. In some examples, a robot part may therefore be created with non-constant joint strength. For instance, at some points of rotational motion, the joint may be made to rotate faster (but weaker), while at other points of rotational motion, the joint may be made to rotate slower (but stronger). The incline angles of the inner cam and outer cam may be varied in other ways as well.

Figure 4:
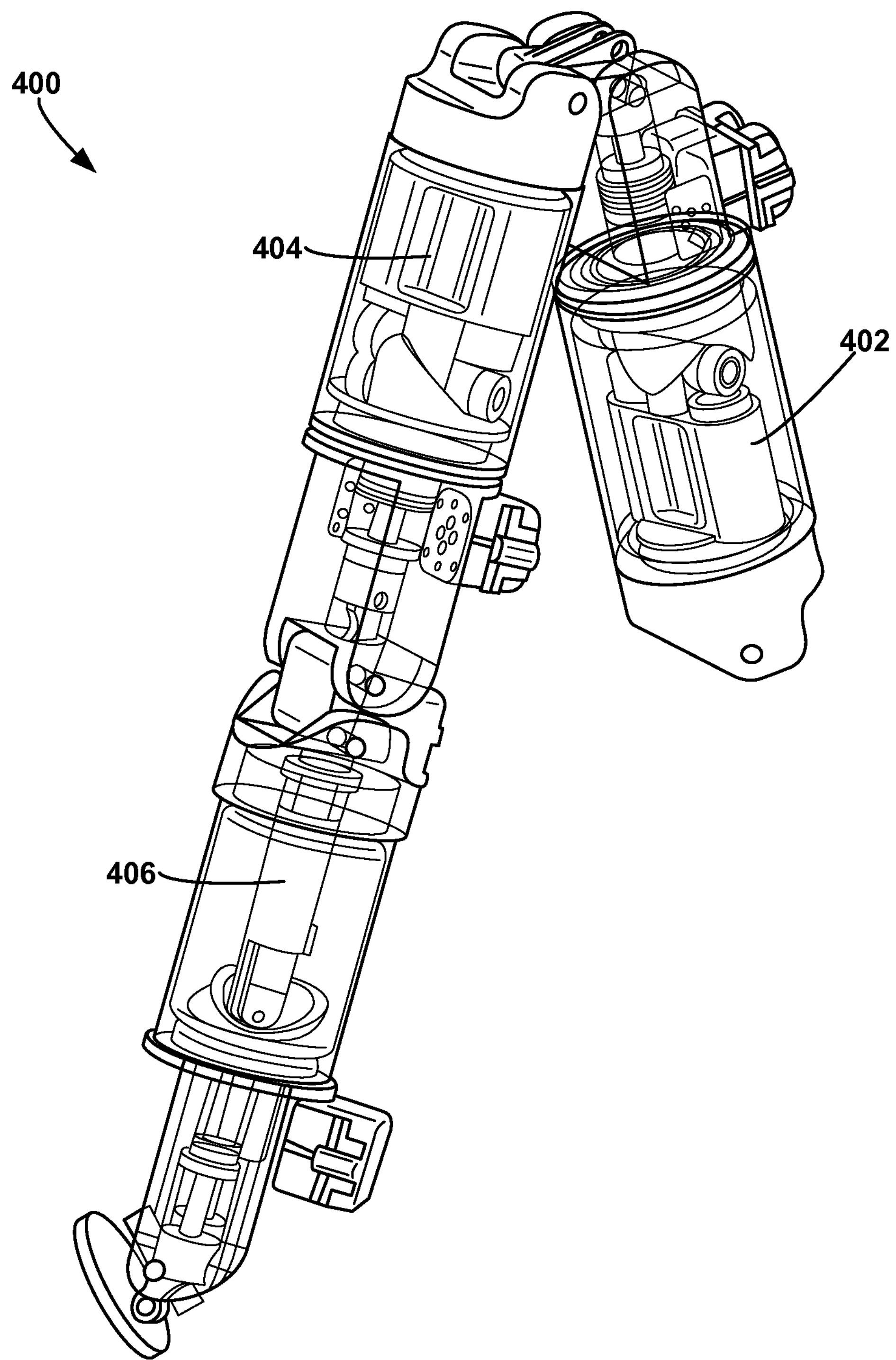
FIG. 4 illustrates a robotic arm, according to an example embodiment.

FIG. 4 shows a robotic arm, according to an example embodiment. More specifically, an example robotic device (such as robotic device 100 in relation to FIG. 1) may include a robot arm 400 equipped with several linear-to-rotary actuators 402, 404, 406. The actuators may be controlled by a control system (e.g., a microprocessor, FPGA, microcontroller, or the like) of the robot to separately rotate different joints of the robot arm 400. For instance, the actuators may be used to rotate particular joints to perform functions or to interact with the environment.

In order to use an actuator to produce rotational motion of the joint, the joint may be coupled to a rotational component of one of the actuators. As an example, the outer cam of one of the actuators may be coupled to a robotic arm joint, and the inner cam of the actuator may be fixed from rotation. Accordingly, linear actuation of one of the pistons of the actuator may cause the outer cam to rotate within a range of motion close to 360 degrees, thereby allowing the robotic arm joint to rotate within a range of motion close to 360 degrees.

Different numbers and placements of linear-to-rotary actuators within a robotic device are also possible. In some examples, one or more of the actuators may include pistons with the same diameter to create joints with symmetric joint strength (e.g., the same torque in both directions). In other examples, one or more of the actuators used for certain joints may include an outer ramp and an inner ramp with non-constant incline angles (e.g., undulating sweeps) to create joints with non-constant joint strength. In additional examples, unbalanced actuators containing pistons with different diameters may be used to create joints with asymmetric joint strength (e.g., more torque in one direction than the other). Other combinations are also possible.

Figure 5:
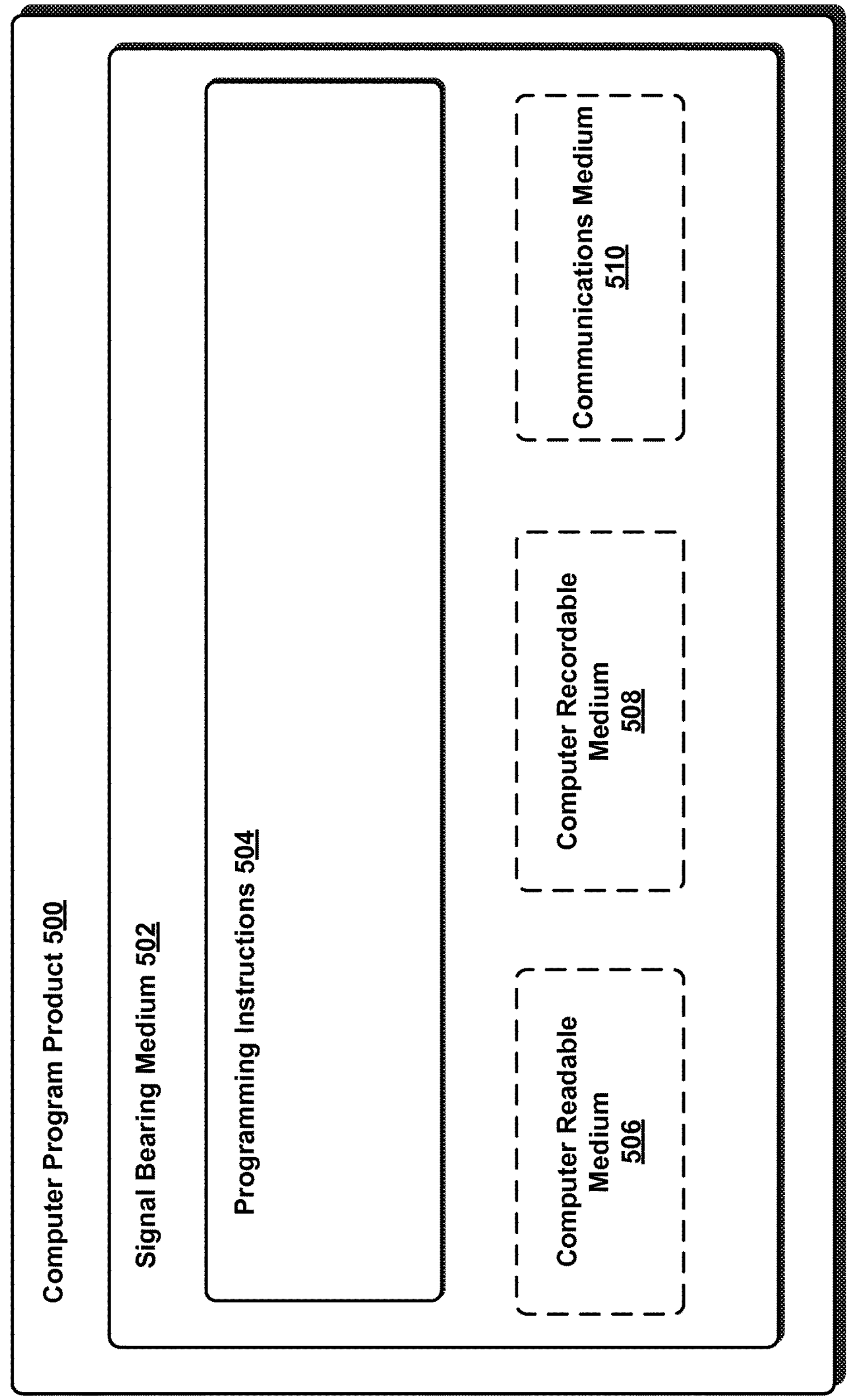
FIG. 5 depicts a computer-readable medium, according to an example embodiment.

FIG. 5 illustrates a computer-readable medium configured according to an example embodiment. In example embodiments, an example robotic device can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

In some embodiments, example functions or methods may be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1, 2A-2C, 3A-3C, and/or 4. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device such as the processor 118 of FIG. 1 is configured to provide various operations, functions, or actions in response to the programming instructions 504 conveyed to the processor 118 by one or more of the computer-readable medium 506, the computer recordable medium 508, and/or the communications medium 510.

The non-transitory computer-readable medium 508 could also be distributed among multiple data storage elements, which could be remotely located from each other. The device that executes some or all of the stored instructions could be a client-side computing device. Alternatively, the device that executes some or all of the stored instructions could be a server-side computing device.

Within some examples herein, operations may be described as methods for performing functions, and methods may be embodied on a computer program product (e.g., a tangible computer readable storage medium or non-transitory computer readable medium) that includes instructions executable to perform the functions.

Figure 6:
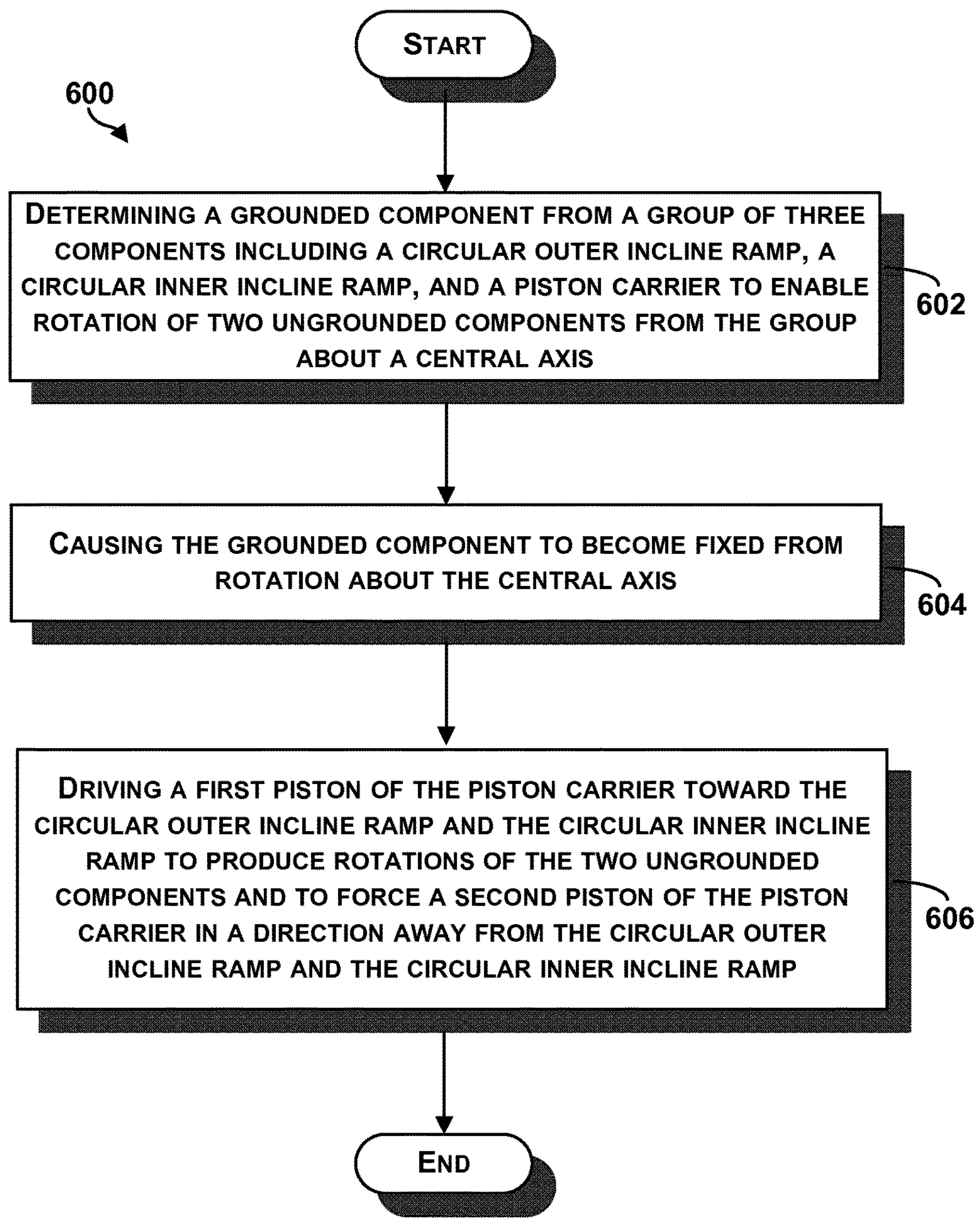
FIG. 6 is a flowchart illustrating an example method, according to an example embodiment.

FIG. 6 is a flowchart illustrating an example method 600 for operating a robotic device. The method 600 may be embodied as computer executable instructions stored on non-transitory media, such as the configuration described above in relation to FIG. 5, for example.

At block 602, the method 600 may include determining a grounded component from a group of three components including a circular outer incline ramp, a circular inner incline ramp, and a piston carrier. More specifically, the three components may be arranged such as illustrated and described with respect to FIGS. 2A-2C, FIGS. 3A-3C, and/or FIG. 4. One component from the group may be chosen as the ground to enable rotation of the remaining two components about a central axis. For instance, in order to produce a gearing effect to achieve an extend range of rotational motion, either the inner cam or the outer cam may be chosen as the ground. To cause the two end cams to rotate in opposite directions, the piston carrier may instead be chosen as the grounded component.

At block 604, the method 600 may also include causing the grounded component to become fixed from rotation about the central axis. For instance, a device may include one or more separate actuators that function to prevent rotation of one or more of the outer cam, the inner cam, and the piston carrier. Once a component to serve as the ground is selected, a corresponding actuator may be activated to stop the grounded component from rotating. In some examples, the grounded component may be changed at one or more points in time as well, depending on desired output from the actuator.

At block 606, the method 600 may further include driving first piston of the piston carrier toward the circular outer incline ramp and the circular inner incline ramp. More specifically, a control system may select which of the two pistons to activate depending on which direction of rotation is desired for the ungrounded components. A roller of the piston may act on the two end cams, producing rotations of the two ungrounded components, and also forcing the second piston in a direction away from the two end cams. In some examples, the method may further include driving the second piston toward the end cams at a future point in time to cause the two ungrounded components to rotate in opposite directions.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device, comprising:

a rounded outer incline ramp surrounding a central axis;

a rounded inner incline ramp surrounding the central axis with a smaller radius than the rounded outer incline ramp, wherein the rounded inner incline ramp and the rounded outer incline ramp are inversely aligned relative to the central axis; and a piston carrier oriented in a direction parallel to the central axis, comprising:

a first piston comprising a first roller positioned on the rounded outer incline ramp and the rounded inner incline ramp at a first point, wherein the first piston is configured to act on the rounded outer incline ramp and the rounded inner incline ramp in a direction parallel to the central axis; and a second piston comprising a second roller positioned on the rounded outer incline ramp and the rounded inner incline ramp at a second point opposite the first point, wherein the second piston is configured to act on the rounded outer incline ramp and the rounded inner incline ramp in a direction parallel to the central axis.

2. The device of claim 1, wherein the first point comprises a point at which surfaces of the rounded outer incline ramp and the rounded inner incline ramp have a same height orthogonal to the central axis.

3. The device of claim 1, wherein each of the rounded outer incline ramp and the rounded inner incline ramp comprises a first semicircular portion extending from a lowest point to a highest point and a second semicircular portion opposite the first semicircular portion.

4. The device of claim 1, wherein the rounded outer incline ramp and the rounded inner incline ramp have the same pitch.

5. The device of claim 1, wherein the rounded inner incline ramp is fixed from rotation such that a linear motion of one of the first piston or the second piston toward the rounded inner incline ramp and the rounded outer incline ramp causes a rotation of the piston carrier and the rounded outer incline ramp.

6. The device of claim 5, wherein the rounded outer incline ramp and the rounded inner incline ramp have the same pitch such that a linear motion by one of the first piston or the second piston toward the rounded inner incline ramp and the rounded outer incline ramp causes the rounded outer incline ramp to rotate twice as fast as the piston carrier.

7. The device of claim 1, wherein the piston carrier is fixed from rotation such that a linear motion by one of the first piston or the second piston toward the rounded inner incline ramp and the rounded outer incline ramp causes a rotation of the rounded inner incline ramp and the rounded outer incline ramp in opposite directions.

8. The device of claim 7, wherein the rounded outer incline ramp and the rounded inner incline ramp have the same pitch such that a linear motion by one of the first piston or the second piston toward the rounded inner incline ramp and the rounded outer incline ramp causes the rounded outer incline ramp to rotate at a same speed as the rounded inner incline ramp.

9. The device of claim 7, wherein the rounded outer incline ramp and the rounded inner incline ramp have a different pitch such that a linear motion by one of the first piston or the second piston toward the rounded outer incline ramp and the rounded inner incline ramp causes the rounded outer incline ramp to rotate at a different speed than the rounded inner incline ramp.

10. The device of claim 1, wherein the first roller comprises a first outer roller positioned along the rounded outer incline ramp and a first inner roller positioned along the rounded inner incline ramp such that the first outer roller and the first inner roller are configured to roll independently of each other.

11. The device of claim 1, wherein at least one of the rounded outer incline ramp and the rounded inner incline ramp has a non-constant incline angle such that a linear motion by one of the first piston or the second piston toward the rounded outer incline ramp and the rounded inner incline ramp causes a rotation of at least one of the rounded outer incline ramp and the rounded inner incline ramp with non-constant speed.

12. A robotic system comprising:

at least one rotational joint; and at least one actuator configured to enable rotation of the at least one rotational joint, wherein the at least one actuator comprises:

a rounded outer incline ramp surrounding a central axis;

a rounded inner incline ramp surrounding the central axis with a smaller radius than the rounded outer incline ramp, wherein the rounded inner incline ramp and the rounded outer incline ramp are inversely aligned relative to the central axis; and a piston carrier oriented in a direction parallel to the central axis, comprising:

a first piston comprising a first roller positioned on the rounded outer incline ramp and the rounded inner incline ramp at a first point, wherein the first piston is configured to act on the rounded outer incline ramp and the rounded inner incline ramp in a direction parallel to the central axis; and a second piston comprising a second roller positioned on the rounded outer incline ramp and the rounded inner incline ramp at a second point opposite the first point, wherein the second piston is configured to act on the rounded outer incline ramp and the rounded inner incline ramp in a direction parallel to the central axis.

13. The robotic system of claim 12, wherein the rounded inner incline ramp of an actuator from the at least one actuator is fixed from rotation and the rounded outer incline ramp of the actuator is coupled to a rotational joint from the at least one rotational joint such that a rotation of the rounded outer incline ramp produces a corresponding rotation of the rotational joint.

14. The robotic system of claim 13, wherein the rounded outer incline ramp and the rounded inner incline ramp of the actuator have the same pitch such that a linear motion by one of the first piston or the second piston toward the rounded outer incline ramp and the rounded inner incline ramp of the actuator causes the rotational joint to rotate twice as fast as the piston carrier of the actuator.

15. The robotic system of claim 12, wherein at least one of the rounded outer incline ramp and the rounded inner incline ramp of the actuator has a non-constant incline angle such that a linear motion by one of the first piston or the second piston toward the rounded outer incline ramp and the rounded inner incline ramp of the actuator causes the rotational joint to rotate at a non-constant speed.

16. The robotic system of claim 15, wherein the at least one of the rounded outer incline ramp and the rounded inner incline ramp of the actuator that has the non-constant incline angle comprises a surface with a plurality of undulations.

17. The robotic system of claim 12, wherein the first roller of the at least one actuator comprises a first outer roller positioned along the rounded outer incline ramp and a first inner roller positioned along the rounded inner incline ramp such that the first outer roller and the first inner roller are configured to roll independently of each other.

* * * * *